Patented July 25, 1950

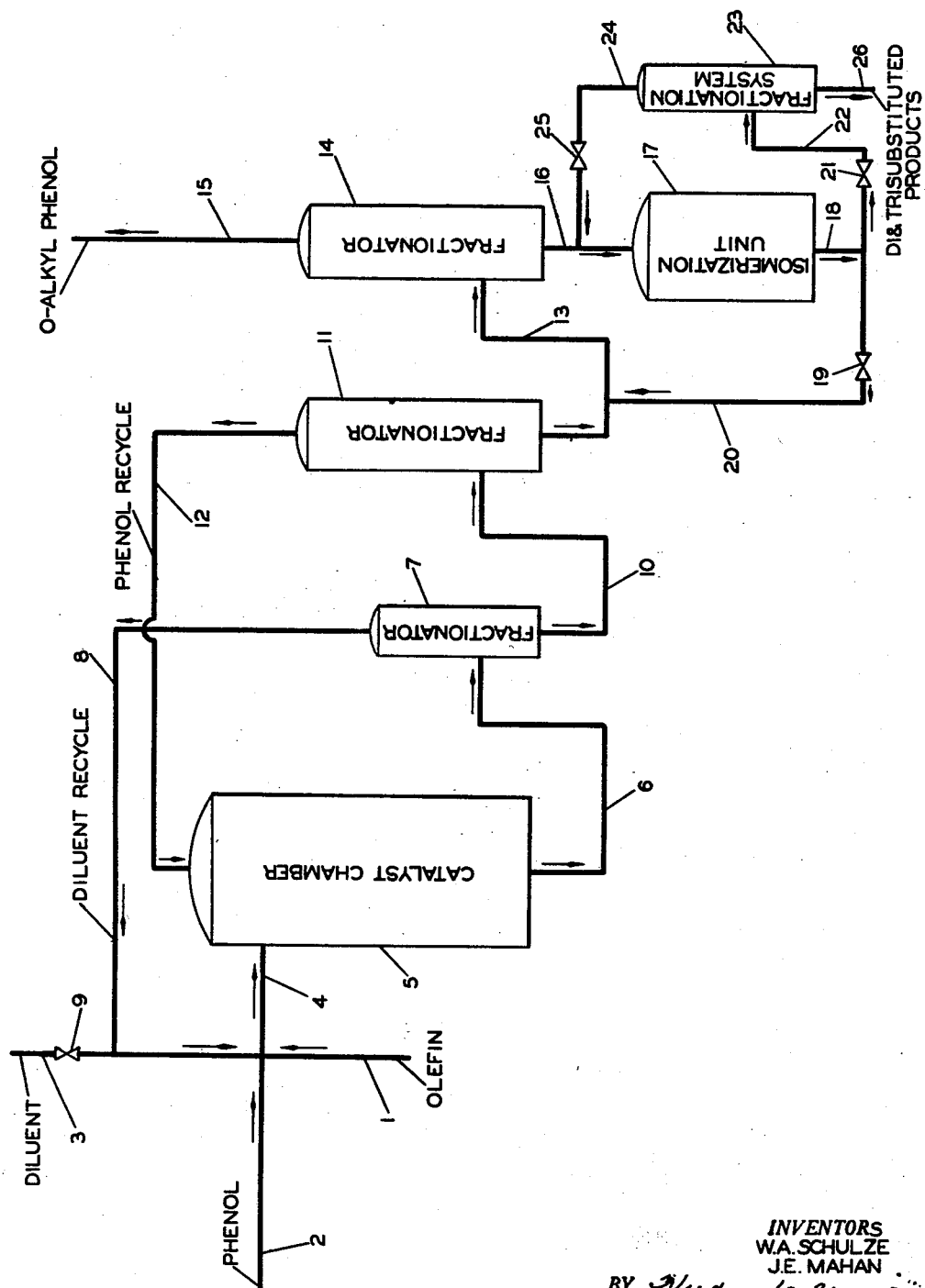

2,516,152

UNITED STATES PATENT OFFICE 2,516,152

PROCESS FOR ISOMERIZING PARA ALKYL PHENOLS TO ORTHO ALKYL PHENOLS

Walter A. Schulze and John E. Mahan, Bartlesville, Okla., assignors to Phillips Petroleum Company, a corporation of Delaware Application March 26, 1946, Serial No. 657,216

6 Claims. (Cl. 260—624)

This invention relates to a process for the production of ortho-alkyl phenols by the catalytic isomerization of para-alkyl phenols.

Heretofore the alkylation of phenols has been accomplished in the presence of catalysts of the Friedel-Crafts type as well as with strong mineral acids and the procedures have included the use of alkyl halides and alcohols as alkylating agents. There are numerous disadvantages inherent in these processes such as the low yields realized, large quantities of condensing agent required, sludge disposal problems, non-selectivity of catalysts and the like. The high operating costs attendant in these conventional phenol alkylation processes render such procedures economically unattractive if, indeed, they are at all feasible for large scale operations.

The alkylation of phenols is particularly complicated on account of the high reactivity of the phenolic group in the presence of catalysts which have been used in such alkylations. For example, aralkyl ethers are formed in relatively large quantities when attempts are made to introduce alkyl groups into the nucleus of phenols. Other side reactions occur, resulting from the non-selectivity of the catalyst, giving rise to a variety of extraneous products. The formation of relatively large amounts of polysubstituted phenols is frequently noted, thus accounting for greatly decreased yields of the desired monoalkyl derivatives.

In our copending application, Serial No. 653,590, filed March 11, 1946, of which this application is a continuation-in-part, we have described a process for the alkylation of phenols wherein unusually high yields of monoalkyl products were realized. In the present application the preparation of ortho derivatives is described. This process represents a definite advance in the art of phenol alkylation since processes heretofore developed give yields of ortho compounds that are so low as to be of practically no value on a commercial basis.

It is an object of the present invention to provide a novel process for the synthesis of ortho-alkyl phenols. It is a further object of the present invention to effect the synthesis of ortho-alkyl phenols by the alkylation of phenols with olefins followed by isomerization to increase the yield of ortho-alkyl phenols. It is a still further object of the present invention to provide a novel process for the isomerization of para-alkyl phenols to form ortho-alkyl phenols.

We have now found a new process for the synthesis of ortho-alkyl phenols wherein phenol is contacted with a mono-olefin in the presence of a solid adsorbent catalyst comprising a synthetic precipitated silica gel promoted by impregnation with relatively minor proportions of certain metal oxides such as aluminum oxide, titanium oxide, zirconium oxide and the like. When these catalysts are employed, reaction conditions may be so selected that monoalkyl phenols are present almost exclusively in the reaction products. The ortho and para compounds are separated by suitable means and the para derivative subjected to an isomerization treatment in the presence of the catalyst employed in the alkylation stage of the process. Through a proper control of reaction conditions in this combination alkylation-isomerization process, unusually high yields of ortho-alkyl phenols are realized. Thus, through an isomerization step the efficiency of the process is greatly improved. It is further noted that, when the preferred catalysts of this invention are used, side reactions are held at a minimum, no more than minute amounts of arylkyl ethers are formed, and the yields of polyalkylated phenols are unusually low.

The process of the present invention comprises the contacting of controlled proportions of phenol and olefin with an adsorbent, metallic oxide promoted silica gel catalyst under alkylating conditions chosen so as to produce high conversion of the olefin and to give high yields of ortho-substituted phenols. The reaction is preferably effected in the presence of an inert diluent which provides a means of temperature control and prevents the formation of undesirable by-products. The hydrocarbon feed mixture may be passed continuously through a stationary bed of granular catalyst, or otherwise contacted with the solid catalyst, and the effluent may be either continuously or intermittently fractionated to recover alkylate from unconverted feed components and inert heat carrying diluent. An excess of phenol is present in the feed with provision made for recycling unconverted phenol to the catalyst. Additional quantities of olefin alkylating agent are introduced into the phenol stream, or directly into the catalyst chamber, to maintain the phenol-olefin ratio at the desired level. Since reaction conditions are regulated to accomplish high conversion of the olefin, the effluent from the alkylation unit comprises chiefly alkylated phenol, unconverted phenol and hydrocarbon diluent. The ortho- and para-alkyl phenols formed in the alkylation step are separated by fractionation and the para compound, containing small quantities of higher boiling products, is fed to an isomerization unit wherein an additional quantity of the ortho-substituted phenol is formed.

In a more specific embodiment of this invention, the selected phenol in admixture with the desired molar proportion of olefin and inert diluent is contacted at a pressure such as to maintain liquid or mixed phase operation, generally in the range of about 100 to 1000 pounds per square inch, at a temperature in the catalyst chamber of from about 150 to 700° F., with a bed of granular, gel type catalyst comprising silica promoted with minor proportions of a metallic oxide. The mol ratio of phenol to olefin may range from slightly more than 1:1 to about 10:1 with a ratio of 2:1 to 3:1 generally preferred. The flow rate, and, therefore, the contact time within the catalyst chamber, is controlled in order to permit extensive reaction of the olefin so that the effluent from the reactor comprises largely unconverted phenol, monoalkylphenol and a small amount of higher boiling material consisting chiefly of dialkyl products. Flow rates of about one to about ten volumes of total feed mixture, comprising reactants and diluent, per volume of catalyst per hour are satisfactory for efficient operation of the process. The products are separated in conventional fractionating equipment and the unchanged phenol and inert diluent are returned to the charge source where additional olefin is introduced into the feed stream. A fractionation step serves to separate the ortho-alkyl phenol from the remaining alkylated material, comprising para-alkyl phenol and small quantities of di- and trisubstituted products, which is contacted with an isomerization catalyst under conditions such that the ortho product is formed from the para derivative. The preferred catalyst is the same as that chosen for the alkylation step of the process. Temperatures in the isomerization unit may range from 200 to 550° F. In the lower portion of this range, up to about 375° F., the reaction rate is relatively slow but losses to undesired products are also very low. From a practical standpoint, it is desirable to operate at temperatures above 375° F. and up to about 550° F. where the reaction rate is sufficiently high to yield substantial conversion of para to ortho isomer per pass through the reaction zone. Operating pressures vary over a wide range depending largely upon the composition of the feed stream that is subjected to isomerization treatment. It is generally desirable to carry out this operation in the liquid or mixed phase and usually the presence of a diluent is preferred. The pressures used in this step of the process may range from 100 to 1000 pounds per square inch.

An application of the present process is further illustrated by reference to the figure which is a simplified flow diagram showing conventional equipment arranged to perform the basic process steps. The selected olefin, phenol and diluent from lines 1, 2 and 3, respectively, are fed via line 4 to catalyst chamber 5 where reaction conditions are controlled in such a way as to favor the formation of mono-alkyl phenols. The effluent from the alkylation unit is passed via line 6 to fractionator 7 where the diluent, containing a small amount of olefin polymer which is generally formed, is taken overhead through line 8 and recycled to the initial diluent stream 3. The flow of fresh diluent to the composite feed stream is regulated by means of valve 9 in line 3. From time to time it may be necessary to remove small amounts of olefin polymer from the diluent recycle stream. This operation may be accomplished by any convenient rerunning operation wherein a portion or all the diluent recycle stream may be either continuously or intermittently fractionated in a separate unit, the diluent taken overhead and the polymer withdrawn as bottoms. The mixture of unconverted phenol and alkylated products remaining in fractionator 7 is transferred through line 10 to fractionator 11 where phenol is taken overhead through line 12 and recycled to catalyst chamber 5. The material remaining in fractionator 11, which comprises ortho- and para-alkyl phenols, generally containing small quantities of higher boiling products such as di- and trisubstituted derivatives, is transferred by means of line 13 to fractionator 14 where the ortho-alkyl phenol is removed through line 15 and the para derivative, containing any higher boiling materials which might be present, is transferred through line 16 to the isomerization unit 17. The effluent from the isomerization unit is passed through line 18, valve 19 and line 20, and returned to fractionator 14 where the ortho-alkyl phenol is taken overhead as before and the para derivative is again recycled to the isomerization unit. During continuous operation of the process of this invention, higher boiling materials accumulate and must be removed from the system. In order to accomplish this end, valve 19 is closed, valve 21 is opened, and the effluent from the isomerization unit is directed through valve 21 and line 22 to a conventional fractionation system 23 wherein the mono-alkyl phenols are removed through line 24 and valve 25 and returned to the isomerization unit 17 while the higher boiling materials are withdrawn through line 26. If desired the effluent stream from the isomerization unit 17 may be divided, part of the stream being directed through valve 19 and line 20 to line 13 and fractionator 14 while the remainder is passed through valve 21 and line 22 and thence to the fractionating system 23. Otherwise, valve 21 is closed to allow the entire stream from the isomerization unit to flow through valve 19 and line 20 and, when it is considered necessary, valve 19 is closed and the stream is directed to the fractionation system 23 via valve 21 and line 22.

The operation of the isomerization stage of this invention may be conveniently carried out in the presence of an inert diluent such as that employed in the alkylation stage. The diluent is introduced into the feed stream prior to entrance into the isomerization unit and is separated from the alkyl phenols by any conventional fractionating equipment interposed in line 20. The diluent is then recycled to line 16 where it is again admixed with the feed to the isomerization unit.

It will be obvious that many variations in details and arrangements may be made in the process of this invention. For example, the di- and trisubstituted products may be recycled to the catalyst chamber 5 where dealkylation is effected or a separate dealkylation unit may be used and the effluent recycled either to catalyst chamber 5 or to fractionator 11. The olefin polymer which forms during the alkylation step may be recovered, if desired, depolymerized and recycled to the initial feed stream or separated and utilized in other syntheses.

The solid adsorbent catalysts which are a feature of the present process are most accurately described as dried gels and are characterized by their chemical composition, their physical properties and by the specific methods of preparation, said methods being responsible in large part for their chemical activity. Although these catalysts are broadly referred to as metallic oxide promoted, silica gel compositions, it is to be understood that they have distinctly different catalytic properties from the naturally occurring minerals which contain some of the same components. For example, the acid treated bleaching earths, clays, kaolins and similar naturally occurring silicates bear no resemblance in composition to our preferred synthetic catalysts.

The catalysts employed in this invention are prepared by forming a hydrous silica gel or jelly usually from an alkali metal silicate and an acid, washing soluble material from the gel, treating or activating said gel with an aqueous solution of a suitable metal salt, and subsequently washing and drying the treated material. In this manner a part of the metal, presumably in the form of a hydrous oxide or loose hydroxide compound formed by hydrolysis, is selectively adsorbed by the hydrous silica and is not removed by subsequent washing. The most frequently used catalyst of this type is a silica-alumina catalyst prepared by treating a wet or partially dried hydrous silica gel with an aluminum salt solution, such as a solution of aluminum chloride or sulfate, and finally washing and drying the treated material. Other catalysts of a similar nature may be prepared by using, instead of an aluminum salt, a hydrolyzable salt of a metal selected from group III—B or from group IV—A of the periodic system. More particularly, salts of indium and thallium in addition to aluminum in group III—B and salts of titanium, zirconium and thorium in group IV—A are employed. Whether prepared by this method or by some modification thereof, the catalyst will contain a major portion of silica and a minor portion of metal oxide. This minor portion of metal oxide, such as alumina, will generally not be in excess of 10 per cent by weight and will often range from about 0.1 to 2.0 per cent by weight.

The reactants of the present invention comprise phenols and mono-olefins. Suitable phenolic intermediates include phenol and its alkyl derivatives as well as catechol, hydroquinone and resorcinol. Olefins applicable in the present process are mono-olefins containing at least three carbon atoms per molecule, and preferably those of secondary or tertiary configuration although primary olefins are not excluded from the scope of the disclosure.

The inert diluents which may be employed include any materials which exert a solvent action on the reactants. Suitable materials include a straight-run naphtha boiling in the range of 200 to 300° F., cyclohexane and low boiling paraffin hydrocarbons such as butane.

Conditions of temperature and pressure may vary within considerable limits depending upon the system under consideration. Ordinarily temperatures of from 150 to about 700° F. are adequate with temperatures of about 300 to 500° F. being most generally preferred. Pressures may vary from about 100 to about 1000 pounds per square inch. Liquid phase contacting is maintained except when low boiling hydrocarbon diluents are employed, in which case the operation is carried out as a mixed phase process. Satisfactory flow rates are found in the range of from one to about ten volumes of total feed mixture, comprising reactants and diluent, per volume of catalyst per hour.

*Example I*

The alkylation of phenol with isobutylene in the presence of silica-alumina as a contact catalyst was effected in a steel reactor at a temperature of 300 to 375° F. and a pressure of 300 pounds per square inch over a 15.6-hour period. A mixture of 3228 grams phenol, 812 grams isobutylene (95.5 per cent pure) and 2770 grams of straight-run naphtha, boiling in the range of 200 to 300° F., was preheated to prevent crystallization of the phenol and then charged to the reactor containing the catalyst at a rate of 4.8 volumes of feed per volume of catalyst per hour. The phenol-isobutylene mol ratio was 2.5:1. A valve on the downstream side of the catalyst case served to control the rate of flow of the feed. The reactor effluent was discharged through a water cooled glass condenser to a glass receiver to which was connected a glass trap cooled in a mixture of Dry Ice and acetone to condense any low boiling hydrocarbons, particularly isobutylene. Fractionation of the reaction products gave 22.2 mol per cent ortho-tert-butylphenol, based on phenol consumed. The mixture of para-tert-butylphenol and higher boiling products was blended with straight-run naphtha and charged to an isomerization unit. Temperature in the isomerization unit was kept within the range of 375 to 450° F. while the pressure was maintained at a sufficiently high level to insure liquid phase operation. A continuous isomerization-fractionation operation was carried out during which time substantially complete conversion of the para-tert-butylphenol to the ortho-substituted derivative was realized. The amount of higher boiling products formed (calculated as di-tert-butylphenol) was 6.0 mol per cent.

*Example II*

The synthesis of ortho-tert-butylphenol was accomplished at a temperature of 200 to 260° F. at a pressure of 275 pounds per square inch in a steel reactor containing a silica-alumina catalyst. A preheated feed stream comprising phenol, isobutylene and a diluent consisting of a straight-run naphtha, boiling in the range of 200 to 300° F., was fed into the reaction chamber from suitable charge bombs under nitrogen pressure. The components of the feed stream were in the approximate weight ratio of five parts phenol, one part isobutylene and four parts diluent or a mol ratio of phenol to isobutylene of 3:1. The general procedure of Example I was followed. The yield of ortho-tert-butylphenol, based on phenol consumed, was 18.5 mol per cent. Substantially complete conversion of the para-tert-butylphenol to ortho-tert-butylphenol was realized during a continuous isomerization-fractionation operation carried out as in Example I. Approximately 7.0 mol per cent of higher boiling material (calculated as di-tert-butylphenol) was formed.

*Example III*

The procedure of Example I was followed for the alkylation of phenol with propylene using a silica-alumina catalyst. The reactor temperature was maintained within the range of 320 to 460° F. while the pressure was held at 400 pounds per square inch. A flow rate of 2.7 to 2.9 volumes of feed per volume of catalyst per hour was employed throughout the reaction. The diluent was the same as that used in Example I and the phenol-propylene mol ratio was 2.3 to 1. Ortho-isopropylphenol was obtained in a mol per cent yield of 36.3, based on phenol consumed. The para-isopropylphenol formed was subjected to a continuous isomerization-fractionation operation as in Example I in order to effect conversion of the para product to the ortho derivative.

We claim:

1. A process for the formation of an ortho-alkyl phenol which comprises subjecting a para-alkyl phenol to isomerization in the presence of a catalyst comprising a silica gel activated by impregnation with a minor proportion of alumina, at a temperature within the range of 200 to 550° F. and a pressure within the range of 100 to 1000 pounds per square inch sufficient to maintain a liquid phase.

2. A process according to claim 1 wherein the catalyst comprises silica gel containing from 0.1 to 2.0 weight per cent alumina.

3. A process according to claim 1 wherein para-tertiary butyl phenol is isomerized to ortho-tertiary butyl phenol.

4. A process for the conversion of para-alkyl phenol to ortho-alkyl phenol in high yields which comprises contacting said para-alkyl phenol with a silica-alumina gel type isomerization catalyst at a temperature within the range of 375 to 550° F. and a pressure within the range of 100 to 1000 pounds per square inch sufficient to maintain a liquid phase, separating and recovering ortho-alkyl phenol so produced and unreacted para-alkyl phenol, and returning the latter to contact with the catalyst for further conversion to ortho-alkyl phenol.

5. A process for the formation of an ortho-alkyl phenol which comprises subjecting a para-alkyl phenol in admixture with an inert saturated hydrocarbon diluent to isomerizing temperatures within the range of 250 to 550° F. at a pressure within the range of 100 to 1000 pounds per square inch sufficient to maintain a liquid phase and in the presence of an isomerizing catalyst comprising a silica gel activated with from 0.1 to 2.0 weight per cent alumina and prepared by forming a hydrous silica gel, treating same with an aqueous solution of an aluminum salt to adsorb hydrous aluminum oxide on the gel by hydrolysis, and then washing and drying the thus-treated material to form the catalyst.

6. A process for the conversion of para-tertiary butyl phenol to ortho-tertiary butyl phenol in high yields with low yields of poly-butyl phenols which comprises continuously passing said para-tertiary butyl phenol through a reaction zone in contact with a silica gel activated by treatment with a hydrolyzable salt of aluminum followed by washing and drying to form a minor proportion of aluminum oxide in said gel, at a temperature within the range of 375 to 550° F. and a pressure within the range of 100 to 1000 pounds per square inch sufficient to maintain the reaction mixture in liquid phase, continuously subjecting effluents of said reaction zone to fractional distillation to recover ortho-tertiary butyl phenol so produced, and recovering and returning unreacted para-tertiary butyl phenol to said reaction zone for further conversion to ortho-tertiary butyl phenol.

WALTER A. SCHULZE.
JOHN E. MAHAN.

REFERENCES CITED

The following references are of record in the file of this patent:

UNITED STATES PATENTS

| Number | Name | Date |
| --- | --- | --- |
| 1,887,662 | Read | Nov. 15, 1932 |
| 1,972,599 | Perkins et al. | Sept. 4, 1934 |
| 2,018,065 | Ipatieff | Oct. 22, 1935 |
| 2,115,884 | Schollkopf | May 3, 1938 |
| 2,189,805 | Kyrides | Feb. 13, 1940 |
| 2,337,123 | Olin | Dec. 21, 1943 |
| 2,403,757 | Reeves | July 9, 1946 |
| 2,416,990 | Gorin et al. | Mar. 4, 1947 |